United States Patent
Fukunaga et al.

(10) Patent No.: US 7,634,065 B2
(45) Date of Patent: Dec. 15, 2009

(54) SERVICE SERVER AND VOICE MESSAGE COLLECTING METHOD

(75) Inventors: Yoshitsugu Fukunaga, Tokyo (JP); Ryo Suzuki, Tokyo (JP); Takuya Shimomura, Tokyo (JP); Tadashi Suzuki, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 794 days.

(21) Appl. No.: 11/062,445

(22) Filed: Feb. 22, 2005

(65) Prior Publication Data

US 2005/0190894 A1 Sep. 1, 2005

(30) Foreign Application Priority Data

Feb. 23, 2004 (JP) ............................. 2004-046475

(51) Int. Cl.
*H04M 11/06* (2006.01)
(52) U.S. Cl. ...................... 379/88.13; 40/717; 358/1.13; 358/1.2; 700/233; 704/270; 715/717
(58) Field of Classification Search ............... 379/88.13, 379/88.25; 358/1.15, 1.05, 1.13, 1.2; 704/500, 704/270; 709/201; 714/742; 705/402; 355/27, 355/40; 369/14; 434/308; 40/717; 700/233; 715/717

See application file for complete search history.

(56) References Cited

U.S. PATENT DOCUMENTS

| | | | | |
|---|---|---|---|---|
| 5,513,117 A | * | 4/1996 | Small | 700/233 |
| 5,644,557 A | * | 7/1997 | Akamine et al. | 369/14 |
| 5,696,812 A | * | 12/1997 | Ono | 379/88.13 |
| 5,802,179 A | | 9/1998 | Yamamoto | |
| 6,147,742 A | * | 11/2000 | Bell et al. | 355/27 |
| 6,163,656 A | * | 12/2000 | Yoshioka | 396/429 |
| 6,249,765 B1 | * | 6/2001 | Adler et al. | 704/500 |
| 6,349,194 B1 | * | 2/2002 | Nozaki et al. | 434/308 |
| 6,397,184 B1 | * | 5/2002 | Walker | 704/270 |
| 6,646,754 B1 | * | 11/2003 | Redd et al. | 358/1.13 |
| 6,784,899 B1 | * | 8/2004 | Barrus et al. | 715/717 |
| 6,845,583 B2 | * | 1/2005 | Lee | 40/717 |
| 6,943,866 B2 | * | 9/2005 | Redd et al. | 355/40 |

(Continued)

FOREIGN PATENT DOCUMENTS

JP 8-314486 A 11/1996

(Continued)

*Primary Examiner*—Gerald Gauthier
(74) *Attorney, Agent, or Firm*—Birch, Stewart, Kolasch & Birch, LLP

(57) ABSTRACT

A service server comprising:
a database for registering a voice message;
an access information issuing device which issues access information required for inputting the voice message from a user terminal through a network;
a print instructing device which sends the access information to a printer along with a given picture to cause the printer to print the access information and the picture on the same print medium;
an access information input device in which access information obtained on a user terminal is inputted from the user terminal through the network on the basis of the print medium;
a voice message input device in which a voice message is inputted through the network from a user terminal sending the access information;
a voice message registration device which registers the voice message inputted from the user terminal sending the access information in the database in association with the access information; and
a voice message output device which outputs the voice message registered in the data base in association with the access information.

13 Claims, 7 Drawing Sheets

U.S. PATENT DOCUMENTS

| | | | |
|---|---|---|---|
| 7,170,624 B2* | 1/2007 | Chalstrom et al. | 358/1.15 |
| 2005/0076078 A1* | 4/2005 | Salton | 709/201 |
| 2005/0146743 A1* | 7/2005 | Firooz | 358/1.15 |
| 2005/0149399 A1* | 7/2005 | Fukunaga et al. | 705/14 |
| 2005/0246604 A1* | 11/2005 | Fujimoto et al. | 714/742 |
| 2005/0264832 A1* | 12/2005 | Baum et al. | 358/1.2 |
| 2006/0224468 A1* | 10/2006 | Fredlund et al. | 705/26 |

FOREIGN PATENT DOCUMENTS

| | | |
|---|---|---|
| JP | 2002-312269 A | 10/2002 |
| JP | 2002-335343 A | 11/2002 |

* cited by examiner

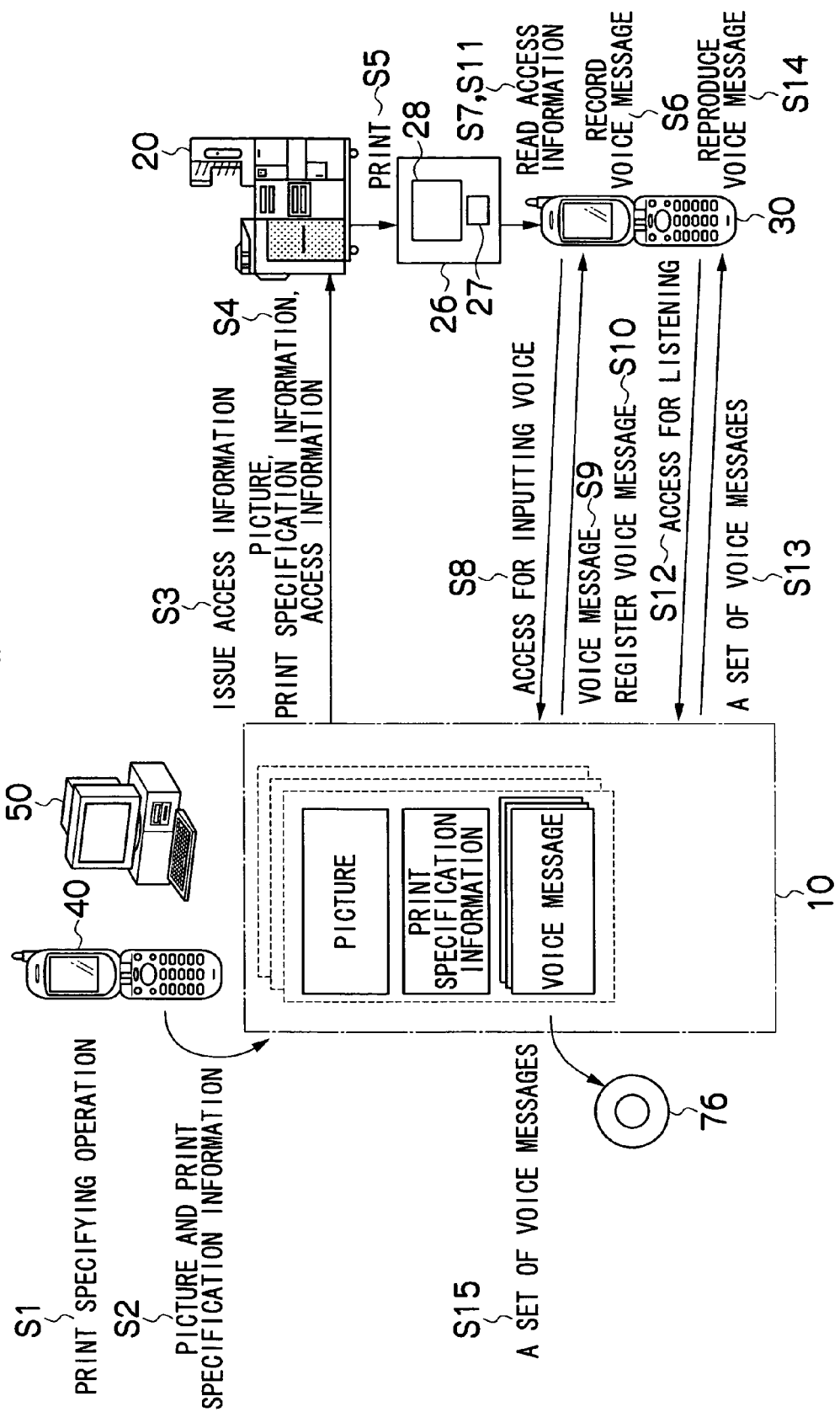

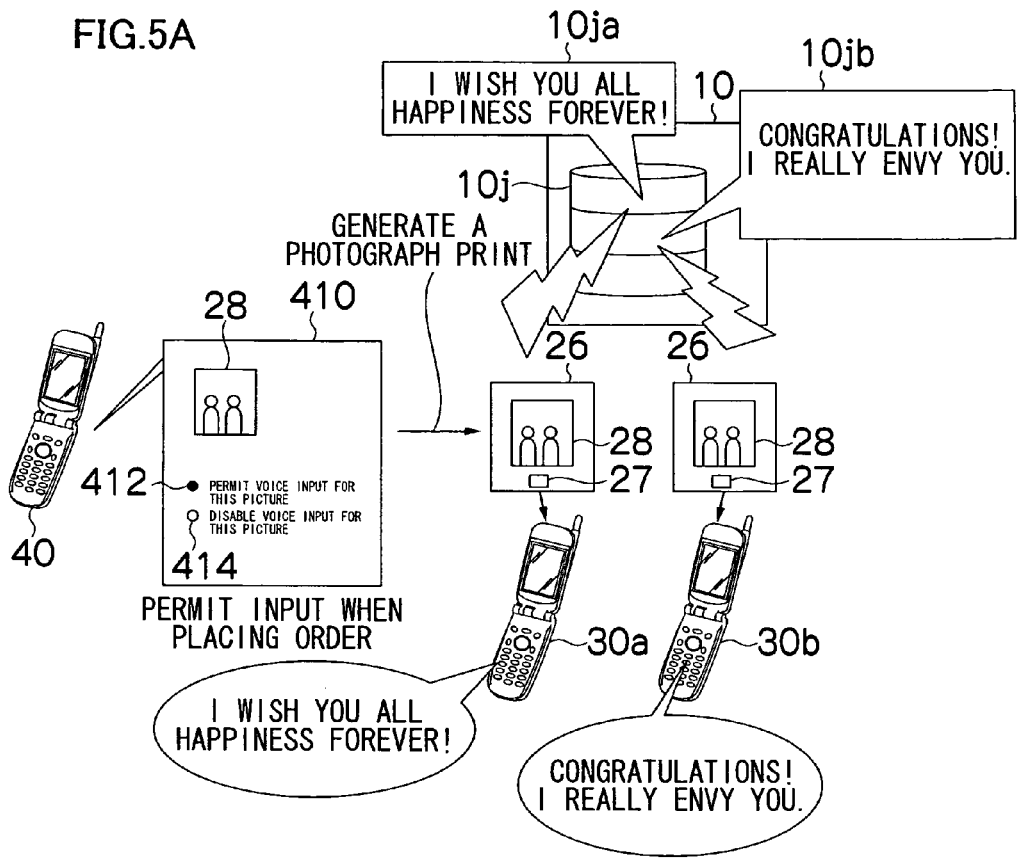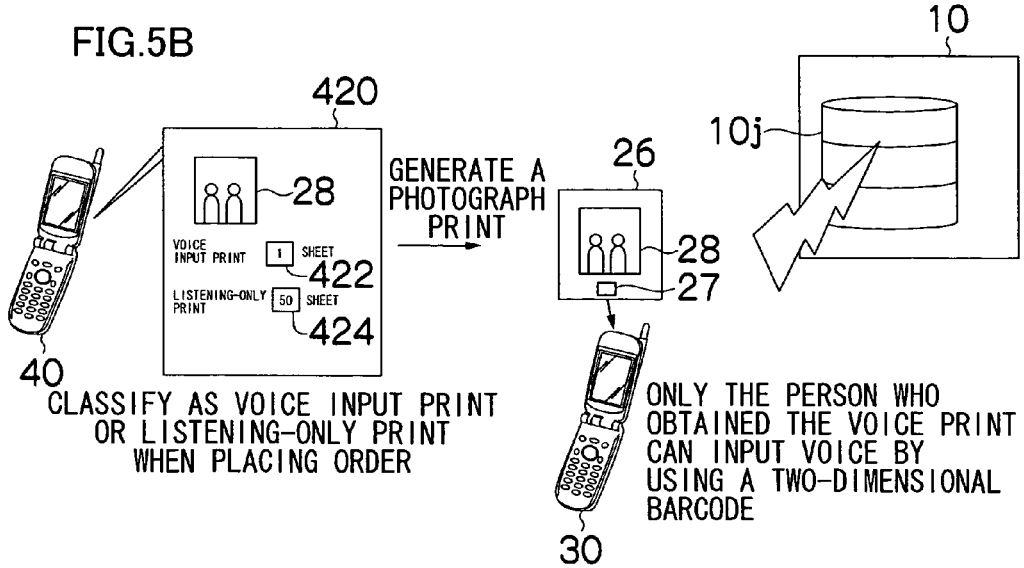

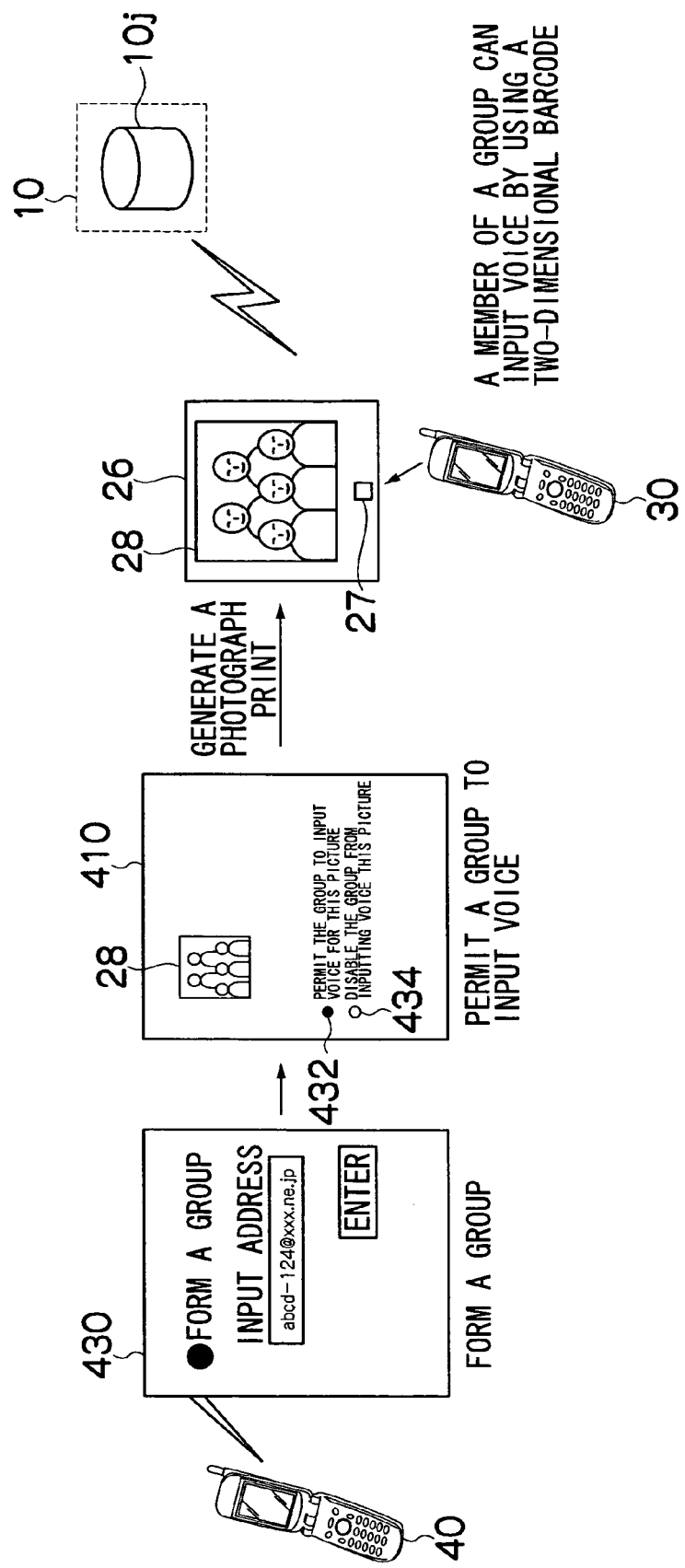

SERVICE SERVER AND VOICE MESSAGE COLLECTING METHOD

BACKGROUND OF THE INVENTION

1. Field of the Invention

The present invention relates to a service server and a voice message collecting method and in particular to a service server and a voice message collecting method for collecting voice messages relating to a picture on paper on which the picture is printed.

2. Description of the Related Art

There is a practice of giving a person to be congratulated on a celebratory occasion such as a wedding ceremony or a person who is given a send-off on an occasion such as an employment or a transfer, a card on which a collection of messages is written by friends of his or hers.

Greeting cards are also widely used on which messages of congratulation, such as "Congratulations!", are already type-printed along with a beautiful picture and capable of outputting a fixed melody or voice by using an IC (Integrated Circuit).

Japanese Patent Application Laid Open No. 08-314486 describes a technology in which a sheet of paper on which a first two-dimensional barcode generated by encoding a voice message, "Congratulations," from a particular person and a second two-dimensional barcode generated by encoding the melody of "Wedding March" are printed is produced. When this sheet is read through a predetermined reader, the sound is played back in a predetermined order so that the voice saying "Congratulations" can be heard with the melody of "Wedding March."

SUMMARY OF THE INVENTION

Traditional cards on which a collection of messages is written provide text messages to a person from friends of his or hers but cannot provide voice messages from them.

While greeting cards capable of playing back a fixed melody or voice are also used, these greeting cards do not provide voice messages from friends of his or hers.

In Japanese Patent Application Laid Open No. 08-314486, there is the description of playing back a number of audio items in a predetermined order, whereas there is no description how voice messages from people are collected.

Cellular phones with audio recording capabilities are becoming popular and are being used for sending videos with sound or for recording voice memos. However, it is difficult to use these cellular phones as audio recorders for collecting voice messages from people. If one wants to collect messages from friends of his or hers with such a cellular phone, he or she cannot collect their voice messages unless he or she circulates the cellular phone to them to collect their voice messages. However, it is undesirable to circulate such a cellular phone to third parties, even friends, because important pieces of personal information, such as addresses, are stored on it and they can make phone calls or various communications through it.

Also, if one wants to pass an audio recorder around all members of a group to collect their voice messages in a party of limited duration and some of them vacillate about what to say and hesitate before recording their voice messages, the audio recorder would not be passed to them all and therefore the collection of voice messages would not be completed. Furthermore, if many of one's colleagues are not in one place but in a number of distant places, it is difficult to collect voice messages from all of them by passing one audio recorder around them.

The conventional practice of giving a collection of handwritten messages from people to a person to whom they want to give congratulations or a send-off is good because handwriting can tell well how they are feeling to him or her, compared with typewritten messages. If such messages can be readily collected as voice messages, the messages would be able to tell each individual person's feeling more effectively than handwritten messages. It is preferable to facilitate collection of emotional voice messages while maintaining the good practice of the traditional collection of written messages if possible.

The present invention has been made in light of these circumstances and an object of the present invention is to provide a service server and a voice message collecting method capable of readily collecting voice messages relating to a picture on a printed medium on which the picture is printed.

In order to achieve the object, a first aspect of the present invention includes a database for registering a voice message; an access information issuing device which issues access information required for inputting the voice message from a user terminal through a network; a print instructing device which sends the access information to a printer along with a given picture to cause the printer to print the access information and the picture on the same print medium; an access information input device in which access information obtained on a user terminal is inputted from the user terminal through the network on the basis of the print medium; a voice message input device in which a voice message is inputted through the network from a user terminal sending the access information; a voice message registration device which registers the voice message inputted from the user terminal sending the access information in the database in association with the access information; and a voice message output device which outputs the voice message registered in the data base in association with the access information.

This configuration allows a print medium on which access information is recorded along with a picture to be delivered to a person and allows the person to readily register his or her voice message recorded on his or her user terminal in a database by accessing the database from his or her user terminal through a network on the basis of the print medium. Thus, the voice message relating to the picture printed on the print medium can be readily registered in the database.

According to a second aspect of the present invention, in the configuration of the first aspect, if a voice message associated with access information obtained on the user terminal is already registered in the database, the voice message registration device registers the voice message inputted from the user terminal in the database in addition to the already registered voice message; and if a plurality of voice messages are registered in the database in association with the access information, the voice message output device outputs the plurality of voice messages associated with the access information.

This configuration allows print medium on which access information is recorded along with a picture to be delivered to people and allows each of the people to readily register his or her voice message recorded on his or her user terminal in a database by accessing the database from his or her user terminal through the network on the basis of the print medium. Thus, the set of people's voice messages relating to the picture printed on the print medium can be readily registered in the database.

According to a third aspect of the present invention, in the configuration of the first aspect, the access information issuing device can issue first access information which permits input of the voice message and second access information which allows only output of the voice message; the print instructing device instructs the printer as to which of the first and second access information should be recorded on a print medium; if the first access information is inputted in the access information input device, a voice message inputted from the user terminal sending the first access information can be registered in the database in association with the first and second access information by the voice message registration device, and if the second access information is inputted in the access information input device, input of a voice message from the user terminal sending the second access information is rejected but the voice message registered in the database in association with the second access information is outputted by the voice message output device to the user terminal sending the access information through the network.

This configuration allows a registered voice message to only be listened to on a user terminal while preventing error additions or error modifications to the voice message.

According to a fourth aspect of the present invention, in the configuration of the third aspect, if a voice message associated with the first access information obtained on the user terminal is already registered in the database, the voice message registration device registers in the database the voice message inputted from the user terminal, in association with the first and second access information in addition to the already registered voice message; and if a plurality of voice messages are registered in the data base in association with the second information, the voice message output device outputs the plurality of voice messages associated with the second access information.

According to a fifth aspect of the present invention, the configuration in the third or fourth aspect further includes: a print specification information input device in which specification information specifying which of the first access information and the second access information should be recorded on a print medium is inputted for each picture.

According to a sixth aspect of the present invention, the configuration of the third or fourth aspect further includes: a print specification information input device in which specification information indicting the number of print medium to be generated on which the first access information is recorded and the number of print medium to be generated on which the second access information is recorded are inputted.

According to a seventh aspect of the present invention, the print instructing device in any one of the first to six aspects sends a user's picture from whom a print order received to the printer along with the access information and causes the printer to record the access information on the same print medium along with the user's picture.

This configuration can provide a voice message collecting service which adds value to the conventional print service of printing a user's picture in response to a print order (photograph print service), in conjunction with the photograph print service.

According to an eighth aspect of the present invention, the voice message output device in any one of the first to seventh aspects retrieves from the database the voice message registered in the database in association with the access information and records the voice message in a removable recording medium.

This configuration allows a removable recording medium on which collected voice messages are recorded to be presented to a person to whom congratulations or a send-off is to be given.

A ninth aspect of the present invention includes the steps of: issuing access information required for inputting a voice message from a user terminal through a network; sending the access information to a printer along with a given picture and causes the printer to record the access information and the picture on the same print medium; inputting the access information from a user terminal through the network, the access information being obtained on the user terminal from the print medium; inputting a voice message from the user terminal sending the access information through the network; registering the voice message inputted from the user terminal sending the access information in a predetermined database in association with the access information; and outputting the voice message registered in the database in association with the access information.

According to a tenth aspect of the present invention, in registering the voice message in the ninth aspect, if a voice message associated with access information obtained on the user terminal is already registered in the database, a voice message inputted from the user terminal is registered in the database in addition to the already registered voice message; and in outputting the voice message, if a plurality of voice messages are registered in the database in association with the access information, the plurality of voice messages associated with the access information is outputted.

According to the present invention, voice messages relating to a picture on a printed medium on which the picture is printed can be readily collected.

BRIEF DESCRIPTION OF THE DRAWINGS

FIG. 4 is an explanatory diagram illustrating a process flow of an example of services performed by the service server according to the embodiment of the present invention;

FIGS. 5A and 5B are explanatory diagrams used for illustrating an operation for specifying a type of access information;

FIG. 7 is an explanatory diagram used for illustrating an operation forming group information.

DETAILED DESCRIPTION OF THE PREFERRED EMBODIMENTS

The best mode for embodying a service server and a voice message collecting method according to the present invention will be described below with reference to the accompanying drawings.

Figure 1:
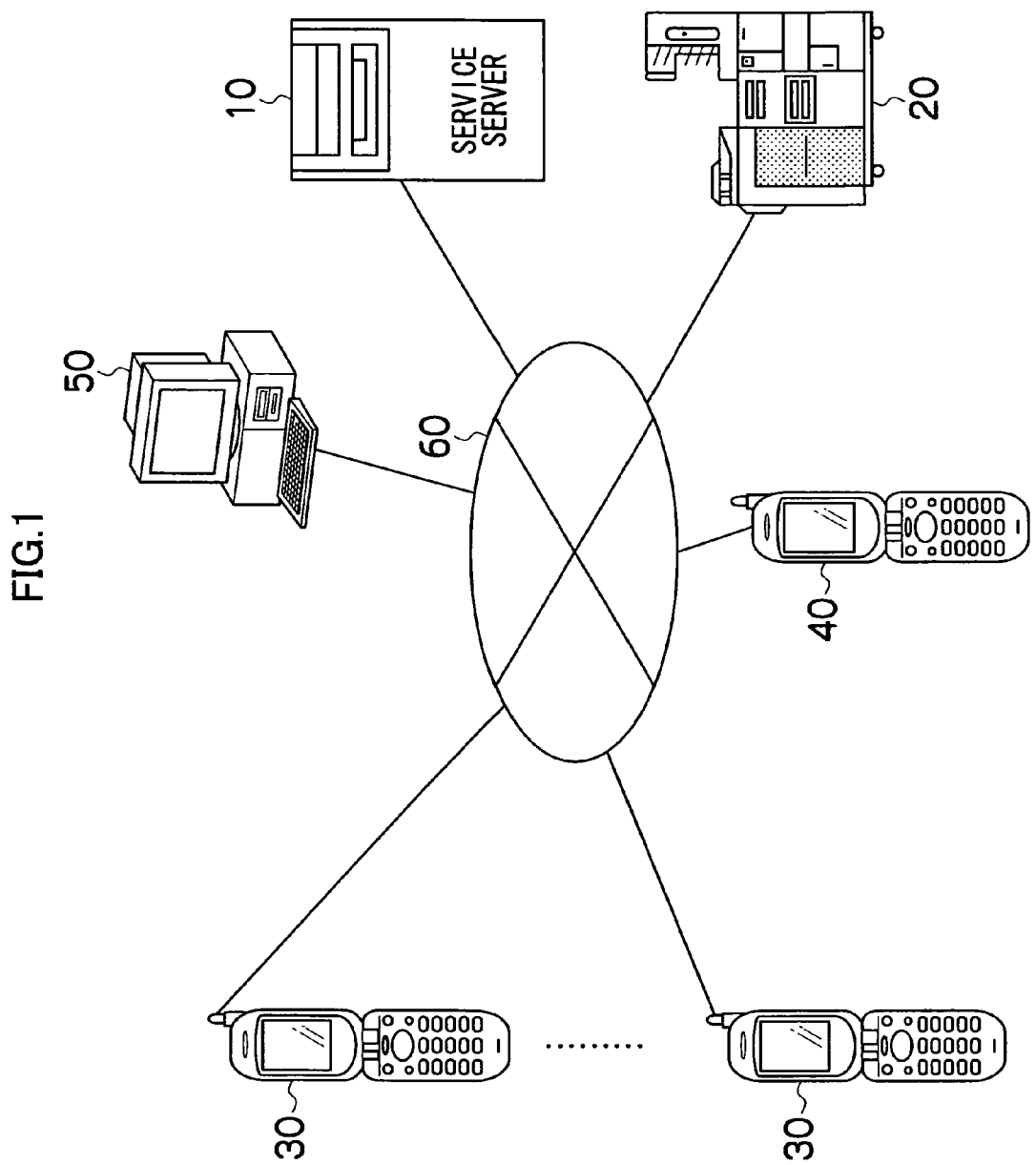
FIG. 1 is a diagram showing a general configuration of a service system including a service server according to one embodiment of the present invention.

FIG. 1 shows a general configuration of a service system including a service server 10 according to an embodiment of the present invention.

The service system in the present embodiment shown in FIG. 1 includes a service server 10, a printer 20, camera-mounted cellular phones (hereinafter simply referred to as the "cellular phones") 30, 40, and an order receiving terminal 50, which are connected to a network 60.

The service server 10 communicates with the printer 20, the cellular phones 30, 40, and the order receiving terminal 50 through the network 60 and performs a photograph print generating process for causing the printer 20 to generate a photograph print according to a print order placed by a user, a voice message registration process for registering a voice message inputted through the network 60 in a predetermined database, a voice message output process for outputting a set of voice messages, and other processes.

The printer 20 generates a photograph print on which a picture is printed according to an instruction from the service server 10. It also can print a two-dimensional barcode such as a QR Code (trademark) on the same sheet of paper on which the picture is printed. While the printer 20 in FIG. 1 is connected with the service server 10 through the network 60, it is not so limited. For example, the printer 20 may be integrated into the service server 10.

The cellular phones 30, 40 are equipped with a camera (not shown) capable of taking a picture of a subject. The camera is also used for inputting a two-dimensional barcode such as a QR Code (trademark). The cellular phones 30, 40 decode the two-dimensional barcode which is inputted from the camera and indicates access information and access the service server 10 through the network 60. The cellular phones 30, 40 in fact are connected through a base station (not shown), which communicates with the cellular phones 30, 40 wirelessly, to the network 60. While the first cellular phone 30 and the second cellular phone 40 are shown in FIG. 1, many cellular phones are connected to the network 60 in practice.

For convenience of explanation, it is assumed here that the first cellular phone 30 is owned by a general user to whom a photograph print is delivered and is used for inputting or outputting voice messages and the second cellular phone 40 is owned by a user who places an order for a photograph print and is used for uploading a picture when the user places an order for printing. It should be noted that this assumption is for convenience of explanation and, in practice, the user can input or output a voice message through the second cellular phone 40 after the user receives a photograph print the user ordered.

The order receiving terminal 50 is mainly used for receiving orders for printing.

An order for printing can be placed in one of two modes in the example shown in FIG. 1. In a first mode, the user places an order for printing from his or her cellular phone 40 to the service server 10 through the network 60 and the service server 10 receives the order for printing. In the first mode, the user's picture is uploaded from the cellular phone 40 of the user placing the order to the service server 10. In the second mode, the order receiving terminal 50 receives an order for printing. In the second mode, the user's picture is uploaded from the order receiving terminal 50 to the service server 10.

Figure 2:
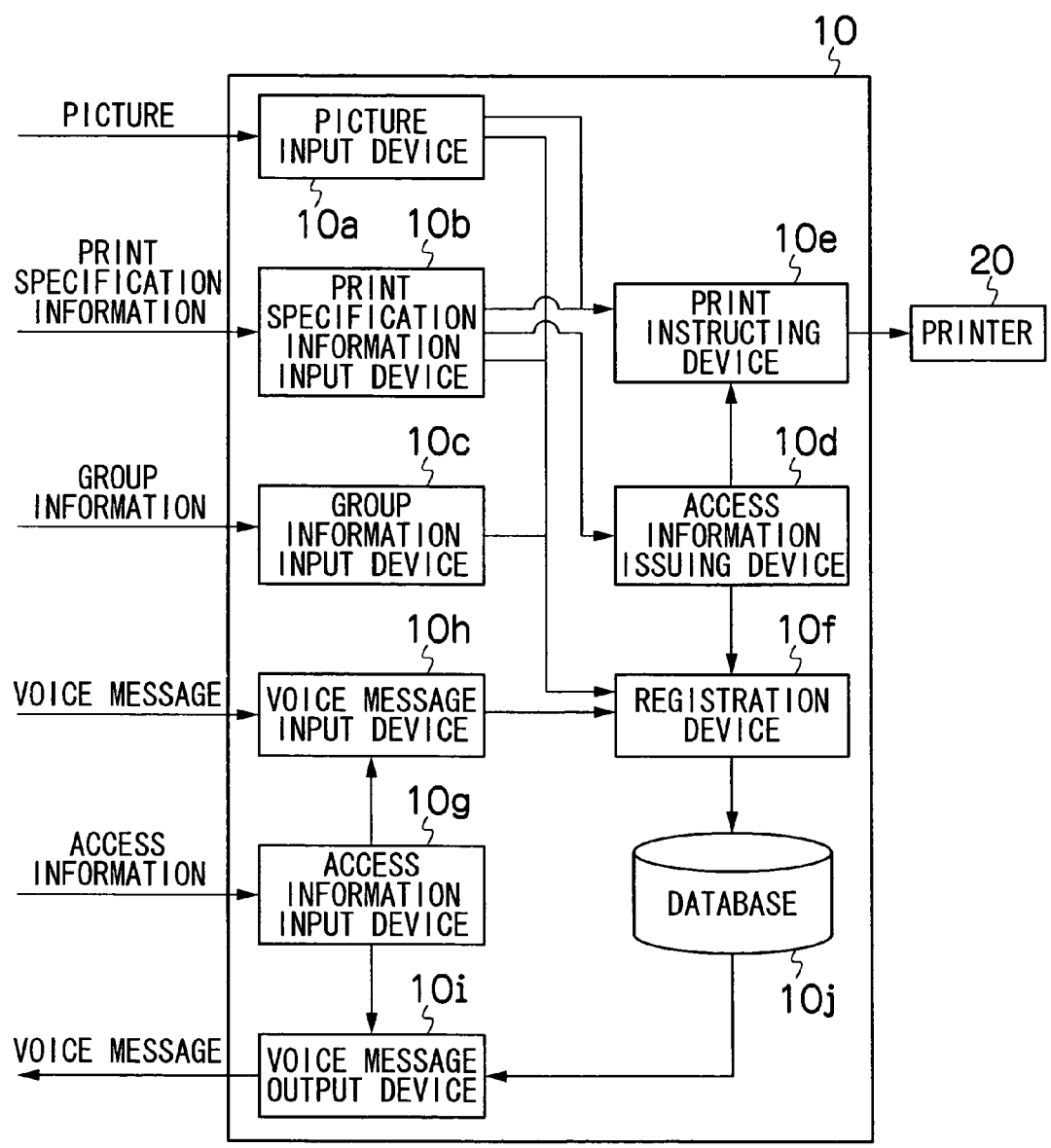
FIG. 2 is a block diagram schematically showing a conceptual configuration of the service server according to the embodiment of the present invention.

FIG. 2 is a block diagram showing a conceptual configuration of the service server 10 according to the present embodiment.

The service server 10 in FIG. 2 includes a picture input device 10a, a print specification information input device 10b, a group information input device 10c, an access information issuing device 10d, a print instructing device 10e, a registration device 10f, an access information input device 10g, a voice message input device 10h, a voice message output device 10i, and a database 10j.

The picture input device 10a is used for inputting a picture taken by the user who places an order for printing.

In a first mode of picture inputting, a picture is sent from the cellular phone 40 of the print ordering user to the service server 10 through the network 60 according to operations by the user on the cellular phone 40 in the service system shown in FIG. 1. In a second mode, a picture is sent from the order receiving terminal 50 to the service server 10 through the network 60 when receiving the order for printing.

The print specification information input device 10b is used for inputting print specification information specifying a print format of a picture and access information. The print specification information includes the type of access information, the number of prints, and the type of the print (such as paper size and whether split print or not).

The type of access information specifies at least whether the access information for permitting the input of a voice message from the cellular phone 30, to the service server 10, of the user to whom a photograph print is delivered (input enabled access information) should be recorded on the paper or access information for allowing only the output of a voice message from the service server 10 to the cellular phone 30 (input disabled access information) should be recorded on the paper. The type of access information can be specified on the print ordering user's cellular phone 40 for each picture to be printed on paper. Screen display information for allowing this specification is sent from the service server 10 to the cellular phone 30 and displayed on the display panel on the cellular phone 30.

As the number of prints, the number of paper sheets on which input enabled access information is to be recorded and the number of paper sheets on which input disabled access information is recorded can be specified separately on the print ordering user's cellular phone 40. Screen display information for performing the specification operations is sent from the service server 10 to the cellular phone 30 and displayed on the display panel of the cellular phone 30.

In a first mode of inputting the print specification information, the print specification information is generated on the cellular phone 40 of the print ordering user according to operations by the user and sent from the cellular phone 40 to the service server 10 through the network 60 in the service system shown in FIG. 1. In a second mode, the print specification information is generated on the order receiving terminal 50 in response to an order for printing and is sent from the order receiving terminal 50 to the service server 10 through the network 60. In a third mode, a person such as an administrator inputs the print specification information on the service server 10 as default print specification information.

The group information input device 10c is used for inputting group information specifying a group to which a user belongs.

The group information indicates at least whether the user to whom a photograph print is to be sent belongs to an input enabled group that is permitted to input voice messages or an input disabled group that is permitted only to output voice messages.

The group information can be generated in different modes. In one mode, an address book pre-registered on the cellular phone 40 of the print ordering user is used to classify the user to whom a photograph print is to be delivered into a group. In this mode, the print ordering user performs an operation for selecting members the user wants to include the input enabled group, thereby forming the group. Once the input enabled group is formed, determination as to whether a user is a member of the input enabled group can be made from the electronic mail address, telephone number, name of the user, and the like. Furthermore, the input enabled group can be divided into subgroups (for example, a group of business associates and a group of friends). On the other hand, the input disabled group may be formed by including in it the others on the address book who do not belong to the input enabled group. Alternatively, the print ordering user may form the input disabled group by performing an operation for selecting members to include the input disabled group, for the sake of classifying them into a subgroup that is permitted only to output voice messages and a subgroup that is denied all access (that is, a group that is prohibited from even outputting voice messages). The group information thus generated is sent from the cellular phone 40 of the print ordering user to the service server 10 through the network 60.

The access information issuing device 10d issues access information which is necessary for accessing the service server 10 from the cellular phone 30 of the user to whom a photograph print is delivered.

The access information is categorized at least as access information for permitting input of a voice message from the cellular phone 30 to the service server 10 (input enabled access information) and as access information for allowing only output of a voice message from the service server 10 to the cellular phone 30 (input disabled access information).

Specifically, the input enabled access information allows both input and output of voice messages, for example. When the input enabled access information is used to access the service server 10 from the cellular phone 30 of the user to whom a photograph print is delivered, the selection as to which of input and output of a voice message is being performed is made as follows. For example, when input enabled access information has been read at the cellular phone 30, an operation for selecting whether to input or output a voice message is accepted.

The input enabled access information is not limited to the mode in which both input and output of voice messages are allowed, but a mode in which only input of voice messages is allowed may be included. In that case, a photograph print on which both of the access information for allowing only input of a voice message (voice-input-only access information) and the access information for allowing only output of a voice message (listening-only access information, namely input disabled access information) are recorded is generated and sent to a user for whom both voice message input and output should be performed.

The print instructing device 10e sends print data including a picture inputted by a user into the picture input device 10a and access information issued by the access information issuing device 10d to the printer 20 and instructs the printer 20 to generate a photograph print according to the print specification information inputted in the print specification information input device 10b. The print specification information may be sent to the printer 20 as is. The printer 20 receives the instruction from the print instructing device 10e and records the user's picture and access information on the same sheet of paper.

Which of the input enable access information and the input disabled access information is recorded on a photograph print can be visually recognized. For example, in the case where the access information is encoded into a barcode and the barcode is printed, the determination can be made from the color of the two-dimensional barcode. Preferably, textural description such as "Voice Input" and "Listening" or an icon indicating whether voice message input is allowed or only listening is allowed are printed along with the two-dimensional barcodes.

The registration device 10f registers pictures, print specification information and voice messages in the database 10j on an order-by-order basis. The pictures, print specification information, and voice messages are associate with access information (both input enabled access information and input disabled access information) issued by the access information issuing device 10d, and are maintained by the database 10j. The registration device 10f also registers group information in the database 10j.

When the access information on a photograph print is recognized on the cellular phone 30 owned by the user to whom the photograph print is delivered, the access information is inputted in the access information input device 10g from the cellular phone 30 through the network 60. Here, input enabled access information or input disabled access information is inputted.

The voice message input device 10h accepts input of a voice message from the cellular phone 30 through the network 60 when input enabled access information is inputted in the access information input device 10g and input of the voice message is requested. In particular, if the input enabled access information is inputted in the access information input device 10g from the cellular phone 30 of the user to whom photograph print is delivered through the network 60 and input of a voice message is requested, the voice message input device 10h accepts the voice message from the cellular phone 30 from which the access information was sent. The inputted voice message is associated with the access information (both input enabled access information and input disabled access information) and registered in the database 10j by the registration device 10f. If the voice message associated with the access information is already stored in the database 10j, the voice message inputted from the cellular phone 30 is registered in the database 10j in addition to the voice message already registered.

If input disabled access information is inputted in the access information input device 10g, the voice message input device 10h does not accept a voice message from the cellular phone 30.

When access information (input enabled or disabled access information) is inputted in the access information input device 10g and output of a voice message is requested, the voice message output device 10i outputs a set of voice messages which are associated with that access information and registered in the database 10j.

If multiple voice messages are associated with the access information and registered in the database 10j, the voice message output device 10i outputs the multiple voice messages associated with the access information.

In a first mode of outputting a voice message, a set of voice messages are outputted through the network 60 to the cellular phone 30 from which access information was sent. In a second mode of outputting a voice message, voice messages are recorded on a removable recording medium such as a CD (Compact Disk).

Figure 3:
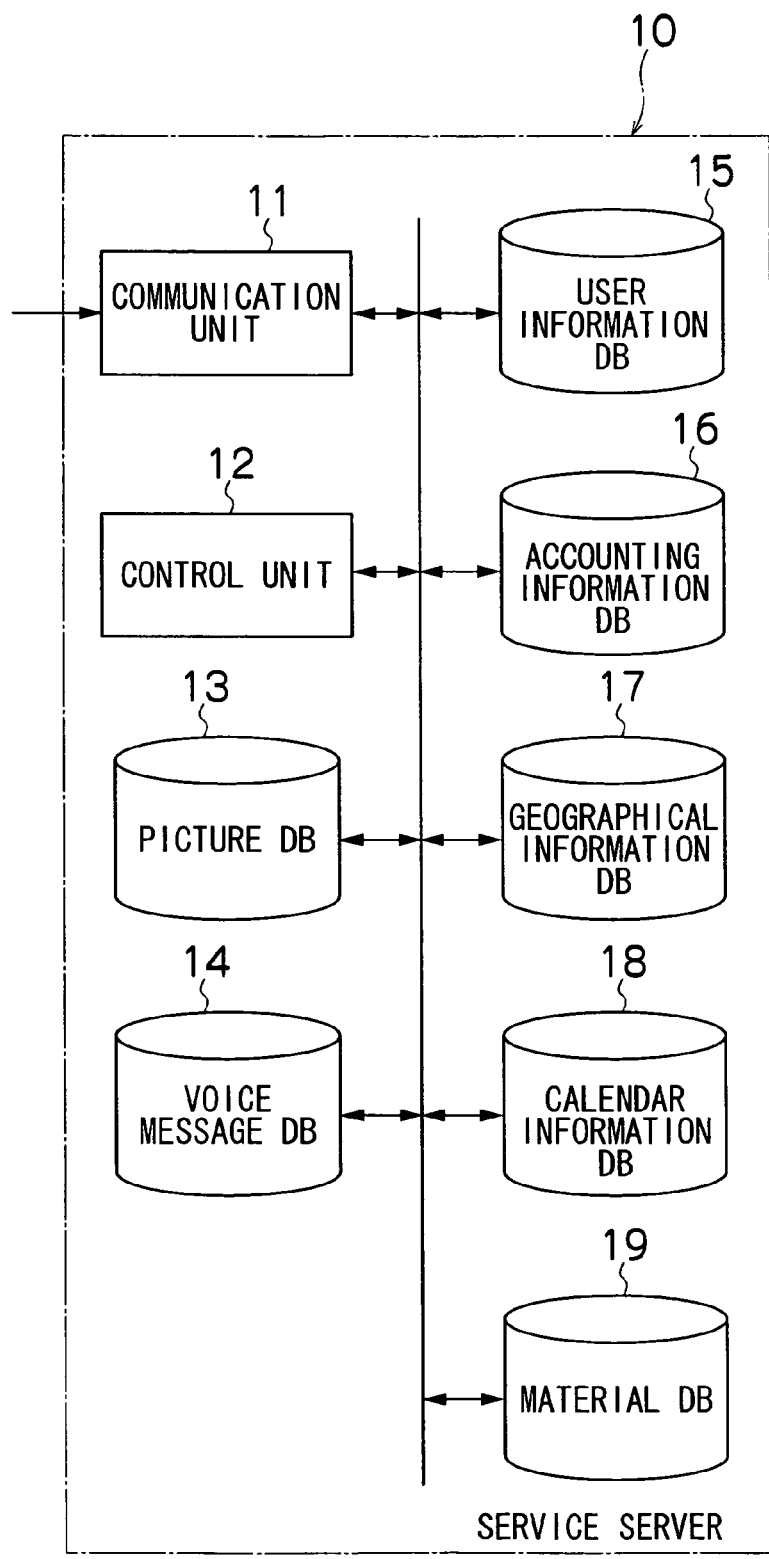
FIG. 3 is a block diagram specifically showing an exemplary internal configuration of the service server according to the embodiment of the present invention.

FIG. 3 is a block diagram showing a specific example of an internal configuration of the service server 10. The service server 10 in FIG. 3 includes a communication unit 11 which communicates with the cellular phones 30, 40 and the order receiving terminal 50 through the network 60, a control unit 12 consisting of a CPU (Central Processing Unit), a picture database 13, a voice message database 14, a user information database 15, an accounting information database 16, a geographical information database 17, a calendar database 18, and a material database 19. It is not necessarily required that the databases 13 to 19 be provided within the housing of the service server 10, but may be provided in a place remote from the service serer 10 and connected to the service server 10 through the network 60 shown in FIG. 1.

The communication unit 11 receives a picture and print specification information from the cellular phone 40 of the print ordering user or the order receiving terminal 50. It also receives group information from the cellular phone 40 of the print ordering user. Furthermore, it receives access information from the cellular phone 30 of the user to whom the photograph print is delivered. Also, it receives a voice message from the cellular phone 30 of the user to whom the photograph print is delivered. Furthermore, it sends a set of voice messages to the cellular phone 30 of the user to whom the photograph print is delivered. The cellular phones 30, 40 and the order receiving terminal 50 can communicate with each other according to the HTTP (Hypertext Transfer Protocol).

The picture database 13 maintains pictures on an order-by-order basis. The voice message database 14 stores and maintains a set of voice messages on an order-by-order basis. The user information database 15 maintains group information and other information about users. The accounting information database 16 maintains print specification information and information about billing of users who ordered printing. The geographical information database 17 maintains geographical information. The calendar database 18 maintains calendar information about years, months, days, days of the week, and holidays. The material database 19 maintains materials of print data to be printed on photographic prints and materials of picture information to be sent to the cellular phones 30, 40.

The user information database 15 manages the storage expiration dates of pictures and voice messages for each printing order. For example, the storage of a picture may expire in two weeks from the date of the print order of the picture and the storage of a voice message may expire in two months from the print order date, by default. If a user requests that a picture or voice message be stored for a period longer than the defaults, the user is charged with an extra fee. When the expiration date is reached, the corresponding ordered picture is deleted from the picture database 13 and the corresponding ordered voice message is deleted from the voice message database 14.

The correspondence between the components of the service server 10 in the specific example shown in FIG. 3 and the components in the conceptual configuration of the service server 10 shown in FIG. 2 will be described briefly. The picture input device 10a, print specification information input device 10b, group information input device 10c, and access information input device 10g are implemented primarily by the communication unit 11; the voice message input device 10h and voice message output device 10i are implemented primarily by the communication unit 11 and the control unit 12; the access information issuing device 10d, print instructing device 10e and registration device 10f are implemented primarily by the control unit 12.

A specific flow of a print service in the service system described above will be described with reference to FIG. 4.

After print ordering user takes a picture of a subject and obtains the picture on the user's cellular phone 40, the user performs print specifying operations, including the specifications of the type of access information, the number of prints, and the type of printing, on the cellular phone 40 (S1). Alternatively, the order receiving terminal 50 may obtain the picture from the user and perform the print specifying operations on reception of the print order.

Specification of the type of access information, that is, determination of access rights to the voice message, can be made in several modes.

In a first mode, a picture selected by the print ordering user is displayed as shown in a specification display screen 410 in FIG. 5A. The user is prompted to perform an operation for specifying the type of access information to be recorded on paper along with the picture, and the specification of the type of access information is accepted for each picture. Specifically, if the option "Permit voice input for this picture" 412 is selected, access information for permitting input will be specified. If the option "Disable voice input for this picture" 414 is selected, access information for disabling input will be specified. The type of access information thus specified for each picture is inputted into the service server 10 through the network 60 as a part of the print specification information.

In a second mode, a picture selected by the print ordering user is presented as shown in a specification display screen 420 in FIG. 5B. The user is prompted to perform an operation for specifying the number of photograph prints on which access information for permitting input is to be recorded along with the picture and the number of photograph prints on which access information for disabling input is to be recorded along with the picture, and these numbers are accepted for each picture. Specifically, the user is prompted to specify the number of photograph prints on which access information for permitting input is to be recorded in a "Voice input print" entry field 422 and to specify the number of photograph prints on which access information for disabling input is to be recorded in a "Listening-only print" entry field 424.

If a default print specification item (for example, the specification for printing each picture on a regular-size paper sheet) is what the print ordering user wants to specify, then the user does not have to perform any specifications but performs an operation for choosing the default print specification.

When the print ordering user performs a predetermined operation for sending on the cellular phone 40, the picture and the print specification information are sent from the cellular phone 40 to the service server 10 through the network 60 (S2).

If a print order is received at the order receiving terminal 50, print specification information is sent from the order receiving terminal 50 to the service server 10.

In this way, the picture and the print specification information are inputted into the service server 10. These items of information inputted into the service server 10 on ordering a print will be sometimes called "order information."

The service server 10 receives the order information and issues access information according to the print specification information included in the order information (S3).

The access information may have a URL, for example. The URL contains a communication protocol required for input and output of voice messages, the domain name of the service server 10 to be accessed, information for identifying the storage location of the voice message, and information indicting whether input is permitted or not.

The picture, the print specification information, and the access information are sent from the service server 10 to the printer 20 (S4). The access information may be encoded into a two-dimensional barcode on the service server 10 before being sent to the printer 20, or may be encoded into a two-dimensional barcode on the printer 20.

The printer 20 generates a photograph print 26 from the picture, the print specification information, and the access information received from the service server 10 (S5). The access information sent from the service server 10 is printed as a two-dimensional barcode 27 on the same paper with the user's picture 28.

In the example shown in FIG. 5A, because the specification to record the access information for permitting input has been made when ordering the print, a photograph print 26 is generated on which the access information 27 for permitting input is recorded along with the user's picture 28. If access information for disabling input had been specified when ordering the print, a photograph print on which the access information for disabling input is recorded with the user's picture would be generated.

In the example shown in FIG. 5B, because generation of one "Voice input print" has been specified when ordering the print, one photograph print 26 on which the access information 27 for permitting input is recorded with the user's picture 28 is generated. In addition, 50 "Listening-only prints" have been specified when ordering the print, 50 photograph prints on which the access information for disabling input (namely the access information for allowing voice message output only) is recorded are generated.

The photograph print 26 generated is directly handed to the print ordering user or delivered to a place specified by the print ordering user.

The following is the description of a process for registering in the database 10j a voice message inputted from the cellular phone 30 to which a photograph print is to be delivered (voice message registration process).

The user to which a photograph print 26 is to be delivered records a voice message on the cellular phone 30 (S6), then places the cellular phone 30 in access information reading mode, and causes the cellular phone 30 to read the two-dimensional barcode 27 on the photograph print 26 (S7). The two-dimensional barcode 27 is decoded on the cellular phone 30 and the decoded access information is sent from the cellular phone 30 to the service server 10 (S8).

The service server 10 receives the access information from the cellular phone 30, determines the type of the access information and, if the access information is access information for permitting input and input of a voice message is requested from the cellular phone 30, further receives the voice message from the cellular phone 30 (S9). Then, the service server 10 associates the voice message received with the access information (both of the access information for permitting input and the access information for disabling input) and registers it in the database 10j (S10). Consequently, the voice message is also associated with the picture corresponding to the voice message through the access information and maintained in the database 10j.

In the example shown in FIG. 5A, because recording of the access information for permitting input on the photograph print 26 has been specified when ordering the print, all people obtaining the photograph print 26 can input their voices (can input voice messages) by using the two-dimensional barcode 27.

If users of cellular phones 30a and 30b who obtained the photograph print 26 want to input voice messages and the user of cellular phone 30a inputs a voice message first, the voice message 10jb of the user of cellular phone 30b is appended to the voice message 10ja of the user of cellular phone 30a in the database 10j.

In the example shown in FIG. 5B, only the person who obtained the "voice input print," which is a photograph print 26 in which voice can be inputted, can input voice (can input a voice message) through the use of the two-dimensional barcode. On the other hand, if a person who obtained a "listening-only print" causes his or her cellular phone 30 to read the two-dimensional barcode recorded on it, input of a voice message is not accepted.

A process for outputting a voice message to the cellular phone 30 to which a photograph print was delivered (voice message output process) will be described below.

A user to which a photograph print 26 was delivered places the cellular phone 30 in access information read mode and causes the cellular phone 30 to read the two-dimensional barcode 27 on the photograph print 26 (S11). The two-dimensional barcode 27 is decoded on the cellular phone 30 and the decoded access information is sent from the cellular phone 30 to the service server 10 (S12).

The service server 10 receives the access information from the cellular phone 30. If the access information is access information for disabling input read from a "listening-only print," or the access information is access information for permitting input and output of voice messages is requested, the service server 10 sends a set of voice messages associated with the access information stored in the database 10j to the cellular phone 30 that sends the access information through the network 60 (S13).

The set of voice messages sent to the cellular phone 30 that sends the access information is reproduced on the cellular phone 30 (S14).

The set of voice messages stored in the database 10j may be written onto a removable recording medium 76 such as a CD (Compact Disk) (S15).

For example, the set of voice messages may be written onto a removable recording medium 76 in a recording device (not shown) directly connected to the service server 10. Alternatively, the two-dimensional barcode on the photograph print 26 may be read through a barcode reader (not shown) connected to the order receiving terminal 50 and the access information may be sent to the service server 10. Then, the order receiving terminal 50 may receive the set of voice messages associated with that access information from the service server 10 and write the set of voice messages onto a removable recording medium 76 loaded in the order receiving terminal 50.

For example, an order for a recording medium 76 containing a set of voice messages may also be received along with a print order. Then, input of voice messages may be closed on a predetermined input closing date (for example, one week from the print order date), a set of voice messages accumulated by that input closing date may be stored on a recording medium 76, and the recording medium 76 may be delivered to an address specified by the print ordering user.

According to the service server and the voice message collecting method in the embodiment described above, a photograph print on which access information for permitting input of a voice message is recorded along with a user's picture can be delivered to friends of the user, thereby readily collecting voice messages relating to the picture from them.

Figure 6:
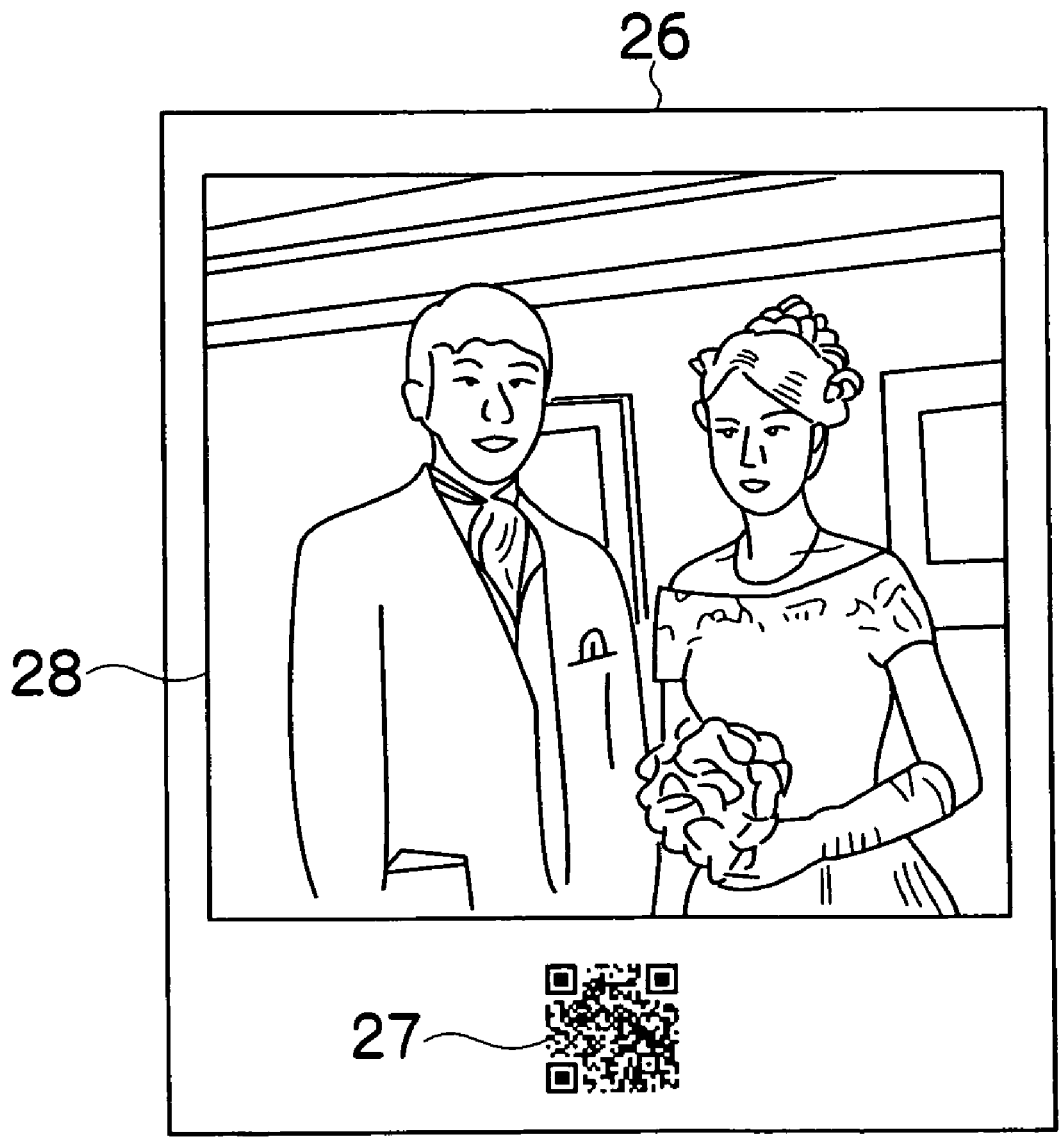
FIG. 6 is a diagram showing an example of a photograph print on which a two-dimensional barcode as access information is recorded.

For example, one photograph print 26 (voice input print) on which access information 27 for permitting input of a voice message may be recorded with a picture 28 of a bridal couple as shown in FIG. 6 may be generated and the voice input print 26 may be circulated to a number of people among the attendants at the wedding reception. Then, the people who received the voice input print 26 may record their voice messages through their cellular phone 30 in turn and then cause the cellular phones 30 to recognize the access information 27. The voice messages are associated and stored with the access information 27 on the database 10 of the service server 10. For example, messages of congratulation, such as "Congratulations on your wedding! I whish you many years of joy and happiness! From X.", "I whish you a happy home. From Y.", and "You are a perfect couple. I envy you. Z.", may be stored in the database 10j in association with the picture.

On the other hand, as many photograph prints (listening-only prints) on which access information for disabling input of a voice message is recorded with a picture of the bridal couple as the attendants (for example 50 prints) may be generated and delivered to all attendants when leaving the reception hall after the wedding reception. The attendants, who received the listening-only prints, cause their cellular phones 30 to recognize the access information. The voice messages are sent from the service server 10 to the cellular phones 30 and thus the attendants as well as the bridal couple can listen the set of voice messages while looking at the picture. A recording medium 76 on which the voice messages are recorded with pictures of the bridal couple, wedding ceremony, and reception is handed to the bridal couple. The bridal couple can enjoy playing back the voice messages along with the picture on an apparatus such as a personal computer at home.

The pictures printed on the "voice input prints" and "listening-only prints" do not have to be identical. Different pictures may be printed on them. For example, a picture of the guest of honor taken before an anniversary party may be printed on "voice input prints" to be delivered before the party and pictures of the party may be printed on "listening-only prints" to be delivered after the party. Again, the access information on the voice input prints and listening-only prints and voice messages are associated with each other and maintained in the database 10*j*.

Permission of voice message input based on group information will be described below.

First, an operation for forming a group is performed on the cellular phone 40 of a print ordering user. For example, a group forming display screen 430 in FIG. 7 is displayed on the display panel of the print ordering user's cellular phone 40. The user inputs the e-mail addresses of the members of the group through the operation panel of the cellular phone 40 and performs operations for forming the group. The group may be formed by performing an operation for selecting the members from an address book registered on the cellular phone 40 or by selecting the group previously formed on the address book. Thus, group information is created on the cellular phone 40 of the print ordering user.

Then, an operation for providing a group with an access right to voice messages is performed. For example, a voice input permission display 440 in FIG. 7 is displayed on the display panel of the cellular phone 40 of the print ordering user. The user is prompted to perform an operation for specifying whether to permit the members of the group to input voice messages, and the specification whether to permit the members of the group to input their voice messages is accepted for each picture. In particular, if the option "Permit voice input for this picture" 432 is selected, input of a voice message is permitted on reception of access information from the cellular phone 30 of a member of the group. If the option "Disable voice input for this picture" 434 is selected, input of a voice message is rejected and only output of a voice message is allowed on reception of access information from the cellular phone 30 of a member of the group. That is, only the members of a group for which the option "Permit voice input for this picture" 432 is selected can input voices through the use of two-dimensional barcodes.

While the present invention has been described with respect to examples in which access information is recorded on photograph prints as two-dimensional barcodes, the present invention is not so limited. The access information may be embedded in a picture in invisible form. In that case, it is preferable that the access information be embedded in the center of the picture.

Furthermore, the access information may be written on an IC tag formed on paper. In that case, a writing device for writing access information on IC tags is provided in the printer 20. Also, a reading device for reading access information from IC tags is provided on cellular phones.

User terminals are not limited to cellular phones. For example, they may be PDAs (Personal Digital Assistants).

The present invention is not limited to the examples shown in the drawings and the examples described as embodiments. Design modifications and improvements may be made to them according to the gist of the present invention, of course.

What is claimed is:

1. A service server comprising:
a database for registering a voice message;
an access information issuing device which issues access information required for inputting the voice message from a user terminal through a network;
a print instructing device which sends the access information to a printer along with a given picture to cause the printer to print the access information and the picture on the same print medium;
an access information input device in which access information obtained on a user terminal is inputted from the user terminal through the network on the basis of the print medium;
a voice message input device in which a voice message is inputted through the network from a user terminal sending the access information;
a voice message registration device which registers the voice message inputted from the user terminal sending the access information in the database in association with the access information; and
a voice message output device which outputs the voice message registered in the data base in association with the access information.

2. The service server according to claim 1, wherein:
if a voice message associated with access information obtained on the user terminal is already registered in the database, the voice message registration device registers the voice message inputted from the user terminal in the database in addition to the already registered voice message; and
if a plurality of voice messages are registered in the database in association with the access information, the voice message output device outputs the plurality of voice messages associated with the access information.

3. The service sewer according to claim 1, wherein:
the access information issuing device can issue first access information which permits input of the voice message and second access information which allows only output of the voice message;
the print instructing device instructs the printer as to which of the first and second access information should be recorded on a print medium;
if the first access information is inputted in the access information input device, a voice message inputted from the user terminal sending the first access information can be registered in the database in association with the first and second access information by the voice message registration device, and if the second access information is inputted in the access information input device, input of a voice message from the user terminal sending the second access information is rejected but the voice message registered in the database in association with the second access information is outputted by the voice message output device to the user terminal sending the access information trough the network.

4. The service server according to claim 3, wherein:

if a voice message associated with the first access information obtained on the user terminal is already registered in the database, the voice message registration device registers in the database the voice message inputted from the user terminal, in association with the first and second access information in addition to the already registered voice message; and if a plurality of voice messages are registered in the data base in association with the second information, the voice message output device outputs the plurality of voice messages associated with the second access information.

5. The service server according to claim 3, further comprising: a print specification information input device in which specification information specifying which of the first access information and the second access information should be recorded on a print medium is inputted for each picture.

6. A service server comprising:

a database for registering a voice message;

an access information issuing device which issues access information required for inputting the voice message from a user terminal through a network;

a print instructing device which sends the access information to a printer along with a given picture to cause the printer to print the access information and the picture on the same pint medium;

an access information input device in which access information obtained on a user terminal is inputted from the user terminal through the network on the basis of the print medium;

a voice message input device in which a voice message is inputted through the network from a user terminal sending the access information;

a voice message registration device which registers the voice message inputted from the user terminal sending the access information in the database in association with the access information; and a voice message output device which outputs the voice message registered in the data base in association with the access information, wherein:

the access information issuing device can issue first access information which permits input of the voice message and second access information which allows only output of the voice message;

the print instructing device instructs the printer as to which of the first and second access information should be recorded on a print medium;

if the first access information is inputted in the access information input device, a voice message inputted from the user terminal sending the first access information can be registered in the database in association with the first and second access information by the voice message registration device, and if the second access information is inputted in the access information input device, input of a voice message from the user terminal sending the second access information is rejected but the voice message registered in the database in association with the second access information is outputted by the voice message output device to the user terminal sending the access information though the network, and wherein:

if a voice message associated with the first access information obtained on the user terminal is already registered in the database, the voice message registration device registers in the database the voice message inputted from the user terminal, in association with the first and second access information in addition to the already registered voice message; and if a plurality of voice messages are registered in the data base in association with the second information, the voice message output device outputs the plurality of voice messages associated with the second access information, the service server further comprising:

a print specification information input device in which specification information specifying which of the first access information and the second access information should be recorded on a print medium is inputted for each picture.

7. The service server according to claim 3, further comprising: a print specification information input device in which specification information indicating the number of print medium to be generated on which the first access information is recorded and the number of print medium to be generated on which the second access information is recorded are inputted.

8. The service server according to claim 4, further comprising: a print specification information input device in which specification information indicating the number of print medium to be generated on which the first access information is recorded and the number of print medium to be generated on which the second access information is recorded are inputted.

9. The service server according to claim 1, wherein the print instructing device sends a user's picture from whom a print order received to the printer along with the access information and causes the printer to record the access information on the same print medium along with the user's picture.

10. The service server according to claim 1, wherein the voice message output device retrieves from the database the voice message registered in the database in association with the access information and records the voice message in a removable recording medium.

11. A voice message collecting method comprising the steps of:

issuing access information required for inputting a voice message from a user terminal through a network;

sending the access information to a printer along with a given picture and causing the printer to record the access information and the picture on the same print medium;

inputting the access information from a user terminal through the network, the access information being obtained on the user terminal from the print medium;

inputting a voice message from the user terminal sending the access information through the network;

registering the voice message inputted from the user terminal sending the access information in a predetermined database in association with the access information; and outputting the voice message registered in the database in association with the access information.

12. The voice message collecting method according to claim 11, wherein, in registering the voice message, if a voice message associated with access information obtained on the user terminal is already registered in the database, a voice message inputted from the user terminal is registered in the database in addition to the already registered voice message; and in outputting the voice message, if a plurality of voice messages are registered in the database in association with the access information, the plurality of voice messages associated with the access information is outputted.

13. A method of registering a voice message in a database in association with access information and outputting the voice message registered in the database in association with the access information comprising:

operating an access information issuing device to issue the access information required for inputting the voice message from a user terminal through a network;

operating a print instructing device to send the access information to a printer along with a given picture and operating the printer to print the access information and the picture on the same print medium;

operating an access information input device to input the access information on a user terminal and sending the access information from the user terminal though the network on the basis of the print medium;

operating a voice message input device to input a voice message through the network from the user terminal sending the access information;

operating a voice message registration device to register the voice message inputted from the user terminal sending the access information in the database in association with the access information; and operating a voice message output device to output the voice message registered in the database in association with the access information, wherein:

the step of operating the access information issuing device includes operating the access information issuing device to issue first access information which permits input of the voice message and second access information which allows only output of the voice message;

the step of operating the print instructing device includes instructing the printer as to which of the first and second access information should be recorded on a print medium, wherein:

if the first access information is inputted by the operation of the access information input device, a voice message inputted from the user terminal sending the first access information is registered in the database in association with the first and second access information by the voice message registration device, and if the second access information is inputted by the operation of the access information input device, input of a voice message from the user terminal sending the second access information is rejected but the voice message registered in the database in association with the second access information is outputted by the voice message output device to the user terminal sending the access information through the network, and wherein:

if a voice message associated with the first access information obtained on the user terminal is already registered in the database, the voice message registration device registers in the database the voice message inputted from the user terminal, in association with the first and second access information in addition to the already registered voice message; and if a plurality of voice messages are registered in the data base in association with the second information, the voice message output device outputs the plurality of voice messages associated with the second access information, the method further comprising:

operating a print specification information input device to input specification information specifying which of the first access information and the second access information should be recorded on the print medium for each picture.

\* \* \* \* \*